US009771932B2

United States Patent
Fisher (10) Patent No.: US 9,771,932 B2
(45) Date of Patent: Sep. 26, 2017

(54) APPARATUS, CONTROLLER AND METHOD FOR CONTROLLING THE COOL DOWN OF AN AIRCRAFT ENGINE ROTOR

(71) Applicant: The Boeing Company, Chicago, IL (US)

(72) Inventor: Robert E. Fisher, Everett, WA (US)

(73) Assignee: The Boeing Company, Chicago, IL (US)

(*) Notice: Subject to any disclaimer, the term of this patent is extended or adjusted under 35 U.S.C. 154(b) by 473 days.

(21) Appl. No.: 14/180,868

(22) Filed: Feb. 14, 2014

(65) Prior Publication Data
US 2015/0233363 A1 Aug. 20, 2015

(51) Int. Cl.
*F04B 35/01* (2006.01)
*F01D 25/20* (2006.01)
(Continued)

(52) U.S. Cl.
CPC .............. *F04B 35/01* (2013.01); *F01D 21/00* (2013.01); *F01D 25/00* (2013.01); *F01D 25/20* (2013.01);
(Continued)

(58) Field of Classification Search
CPC ........ F04B 35/01; F04B 49/24; F04B 49/035; F04B 53/06; F04B 43/02; F04B 49/03; F04B 49/22; F04B 17/05; F04B 17/06; F04B 23/04; F04B 23/06; F04B 23/08; F04B 23/10; F04B 23/103; F04B 23/106; F04B 23/12; F04B 23/14; F04B 35/002; F04B 53/10; B64D 31/02; B64D 31/06;
(Continued)

(56) References Cited

U.S. PATENT DOCUMENTS 2,440,980 A * 5/1948 Sheppard ................ F01D 25/20
184/6.11
2,602,583 A * 7/1952 Haeberlein ............ F04D 29/063
184/6.11
(Continued)

FOREIGN PATENT DOCUMENTS

FR 2953562 A1 * 6/2011 ............. F01D 21/00
GB 1557706 A * 12/1979 ............. B64C 13/40

OTHER PUBLICATIONS

Orginal and translation of FR2953562A1, File named 14180868-ProQuestDocumentsTranslation-FR2953562A1.*
(Continued)

*Primary Examiner* — Theodore Stigell
*Assistant Examiner* — Jon Hoffmann
(74) *Attorney, Agent, or Firm* — Miller, Matthias & Hull LLP (57) ABSTRACT

An apparatus, system, and method for reducing the warpage of a rotor of an aircraft engine. When the aircraft engine is placed in standby mode, a solenoid-operated bypass valve may receive a control signal to open. When open, the solenoid-operated bypass valve places an electric hydraulic pump in fluidic communication with an engine driven hydraulic pump. The engine driven hydraulic pump rotates because of the pressured provided by the electrical hydraulic pump. The mechanical linkage between the engine driven hydraulic pump and the rotor causes the rotor of the aircraft engine to rotate.

9 Claims, 5 Drawing Sheets

(51) Int. Cl.
*F01D 25/00* (2006.01)
*F01D 21/00* (2006.01)
*F04B 17/05* (2006.01)
*F04B 17/06* (2006.01)
*F02C 7/275* (2006.01)
*F02C 7/32* (2006.01)
*F02C 7/36* (2006.01)

(52) U.S. Cl.
CPC .............. *F04B 17/05* (2013.01); *F04B 17/06* (2013.01); *F02C 7/275* (2013.01); *F02C 7/32* (2013.01); *F02C 7/36* (2013.01)

(58) Field of Classification Search
CPC ........ B64D 31/14; B64D 33/00; B64D 33/08; B64D 41/00; F02C 7/275; F02C 7/32; F02C 7/36; F01D 21/00; F01D 21/003; F01D 21/006; F01D 21/02; F01D 21/04; F01D 21/045; F01D 21/08; F01D 21/10; F01D 21/12; F01D 21/14; F01D 21/15; F01D 21/18; F01D 21/20; F01D 25/20; F01D 25/00
USPC .............. 417/307; 180/53.1, 53.4, 53.5, 53.6
See application file for complete search history.

(56) References Cited

U.S. PATENT DOCUMENTS

| | | | | |
|---|---|---|---|---|
| 3,001,360 A | * | 9/1961 | Budzich | F02C 7/268 417/324 |
| 4,062,185 A | * | 12/1977 | Snow | F01D 19/00 60/204 |
| 5,694,765 A | * | 12/1997 | Hield | F02C 3/113 60/39.163 |
| 5,845,483 A | * | 12/1998 | Petrowicz | F02C 7/262 60/39.163 |
| 6,237,322 B1 | * | 5/2001 | Rago | F01D 25/20 60/39.08 |
| 6,390,116 B1 | * | 5/2002 | Kim | B64C 21/04 137/14 |
| 7,942,079 B2 | * | 5/2011 | Russ | F02C 7/32 60/39.15 |
| 7,975,465 B2 | * | 7/2011 | Morris | F02C 6/08 244/60 |
| 8,146,370 B2 | * | 4/2012 | Zeiner | F02C 3/10 60/778 |
| 8,347,998 B2 | * | 1/2013 | Ericson | B60K 6/442 180/165 |
| 8,556,005 B2 | * | 10/2013 | Ozawa | B66F 9/07572 180/53.1 |
| 2005/0188704 A1 | * | 9/2005 | Butt | F01D 25/20 60/778 |
| 2009/0256419 A1 | * | 10/2009 | Anghel | F02N 11/04 307/9.1 |
| 2009/0301053 A1 | * | 12/2009 | Geiger | F01D 21/06 60/39.08 |
| 2010/0013419 A1 | * | 1/2010 | White | H02P 5/74 318/51 |
| 2012/0101775 A1 | * | 4/2012 | Mitchell | F01D 21/003 702/183 |
| 2013/0292195 A1 | * | 11/2013 | Gibson | B60K 6/48 180/53.1 |

OTHER PUBLICATIONS

NPL, Federal Aviation Administration, Aviation Maintenance Technican Handbook-Powerplany, vol. 2, file name, 14180868-FAA-AMT-Powerplant-Vol-2-2012.*

* cited by examiner

APPARATUS, CONTROLLER AND METHOD FOR CONTROLLING THE COOL DOWN OF AN AIRCRAFT ENGINE ROTOR

BACKGROUND

During normal operation, the temperature of an aircraft engine's main shaft (rotor) will reach an equilibrium operating temperature. In most instances, the temperature will be significantly greater than the air surrounding the engine due to the effects of air compression and combustion in the engine. Once the engine is shut down, or stopped, the rotor will typically start cooling down because of the lower temperatures in the environment surrounding the engine. If the cooling of the rotor is uneven, the rotor may become unbalanced, possibly leading to damage when the engine is placed back into service.

It is with respect to these and other considerations that the disclosure herein is presented.

SUMMARY

It should be appreciated that this Summary is provided to introduce a selection of concepts in a simplified form that are further described below in the Detailed Description. This Summary is not intended to be used to limit the scope of the claimed subject matter.

According to one embodiment disclosed herein, a hydraulic system operative to reduce rotor warpage is provided. The hydraulic system includes an engine driven hydraulic pump, a filter apparatus, a hydraulic pump, and a bypass valve. The engine driven hydraulic pump is operative to receive a rotational force in a first direction from an engine rotor to supply hydraulic pressure to the hydraulic system in a first fluid direction. The filter apparatus is operative to filter hydraulic fluid received from the engine driven hydraulic pump in the first fluid direction, the filter apparatus comprising a filter check valve to allow fluid flow in the first fluid direction and prevent fluid flow in a second direction. The hydraulic pump is operative to provide hydraulic fluid to the engine driven hydraulic pump in the second fluid direction. The bypass valve is operative to bypass the filter check valve to allow hydraulic fluid flow in the second direction to cause the engine driven hydraulic pump to rotate in a second rotational direction to cause the aircraft engine to rotate.

According to another embodiment disclosed herein, a control system operative to reduce rotor warpage is provided. The control system includes a control circuit and a bypass valve. The control circuit includes a warpage controller and a sensor. The warpage controller is operative to receive an input relating to a parameter associated with a rotor of an aircraft engine and, in response to the input, output a control signal operative to open or close a bypass valve in a hydraulic system. The sensor is operative to generate the input relating to the parameter associated with a rotor of an aircraft engine. The bypass valve is operative to fluidically connect an electric hydraulic pump to an engine driven hydraulic pump, whereby the electric hydraulic pump provides hydraulic pressure to rotate the engine driven hydraulic pump in a second direction as a hydraulic motor, which in turn is operative to rotate the rotor of the aircraft engine According to yet another embodiment disclosed herein, a method for reducing aircraft engine rotor warpage is provided. The method includes rotating an engine driven hydraulic pump in a first direction, wherein the engine driven hydraulic pump is linked to a rotor, to provide hydraulic fluid in a first fluid direction from the engine driven hydraulic pump to a hydraulic system, receiving an input that an aircraft engine is stopped, energizing an electric hydraulic pump to provide hydraulic flow in a first direction, energizing a solenoid-operated bypass valve, in response to energizing the solenoid-operated bypass valve, routing hydraulic fluid around a filter check valve, the filter check valve configured to prevent hydraulic flow in the first direction and allow hydraulic flow in a second direction, wherein the second direction of the hydraulic flow is a normal direction of fluid flow when the aircraft engine is operating, causing an engine driven hydraulic pump to rotate in a first rotational direction due to the hydraulic flow in the first direction, wherein the first rotational direction is opposite to a second rotational direction in which the engine driven hydraulic pump rotates while the aircraft engine is operating, de-energizing the solenoid-operated bypass valve, and in response to de-energizing the solenoid-operated bypass valve, fluidically disconnecting the engine driven hydraulic pump from the electric hydraulic pump, stopping the rotation of the engine driven hydraulic pump.

The features, functions, and advantages that have been discussed can be achieved independently in various embodiments of the present disclosure or may be combined in yet other embodiments, further details of which can be seen with reference to the following description and drawings.

BRIEF DESCRIPTION OF THE DRAWINGS

The embodiments presented herein will become more fully understood from the detailed description and the accompanying drawings, wherein.

The plurality of figures presented in this application illustrates variations and different aspects of the embodiments of the present disclosure. Accordingly, the detailed description on each illustration will describe the differences identified in the corresponding illustration.

DETAILED DESCRIPTION

The following detailed description is directed to an apparatus, system, and method for controlling the cool down of an aircraft engine rotor. After an aircraft engine is shutdown, the rotor of the aircraft engine (along with other components) begins to cool down from a relatively high operational temperature to a relatively low ambient (or off) temperature. The rotor and other engine components commence a heat exchange operation with outside air. The rate of cool down may vary depending on the heat transfer coefficient of the metal/composites forming the aircraft engine and the temperature of the air surrounding the rotor and components. In some situations, the temperature of some parts of the engine may experience different heat transfer rates depending on their location in the engine. This is illustrated by way of example in FIG. 1.

Figure 1:
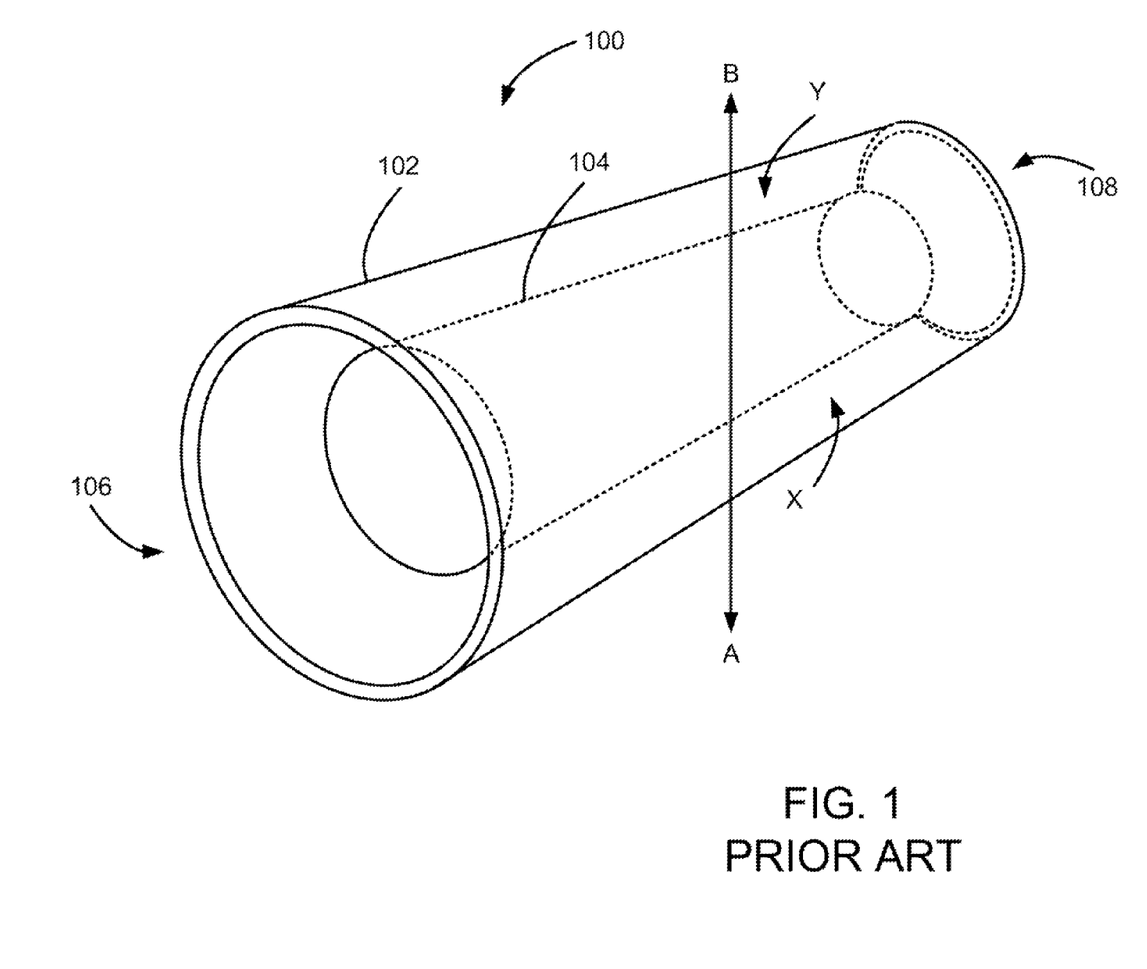
FIG. 1 is a perspective view illustrating a partial aircraft engine according to at least one embodiment disclosed herein.

FIG. 1 is a perspective view illustrating a partially constructed aircraft engine 100. The aircraft engine 100 includes a cowling 102 and a rotor 104. The cowling 102 has an intake portion 106 that allows air to enter the aircraft engine 100. The cowling 102 also has an exhaust portion 108 that allows combusted fluids to exit the aircraft engine 100.

During operation, various components of the aircraft engine 100 will increase in temperature. The rotor 104, which rotates during normal operation, will typically have a temperature that is significantly greater than the surroundings. Various components (not shown) of the aircraft engine 100 are affixed to the rotor 104 during operation, including fan blades.

After operation, the aircraft engine 100 may be stopped and allowed to cool. Because heat rises, for example from location A to location B of line AB, a temperature differential may form across the aircraft engine 100. This temperature differential may cause certain components to have different temperatures at different locations. For example, the bottom X of the rotor 104 may have a lower temperature than the top Y of the rotor 104. The temperature differential may be relatively significant if the temperature of the environment at the bottom X of the rotor 104 is significantly lower than the temperature of the top Y of the rotor 104.

Warping of the rotor 104 may result if the temperature differential between the bottom X of the rotor 104 and the top Y of the rotor 104 is significant. Because the length of metals typically increases or decreases based on the temperature of the metal, caused by expansion and contraction, the length of the rotor 104 at the top Y may be greater than the length of the rotor 104 at the bottom X. Because the rotor 104 is typically a unitary metal or metallic alloy, the difference in lengths can cause the rotor 104 to warp or bend.

Over a period of time, if the rotor 104 is allowed to cool sufficiently, the temperature differential between the top Y and the bottom X of the rotor 104 will begin to decrease, eventually approaching equivalent temperatures. As the temperature differential decreases, the lengths of the rotor 104 at the top Y and the bottom X begin to even, thus reducing the amount of warpage.

If the rotor 104 is not allowed to cool for a sufficient period of time, thus suffering from a particular degree of warpage caused by the temperature differential, and the aircraft engine 100 is placed back into service, the warpage of the rotor 104 may cause damage to the engine. During operation, the rotor 104 may rotate at a relatively high speed of rotation, sometimes on the order of several thousands of rotations per minute. If the rotor 104 is not balanced, the rotation of the rotor 104 may generate vibrations in the aircraft engine 100. When the rotor 104 is warped to a particular degree, the warpage may cause the rotor 104 to be out of balance. The vibrations can shake the aircraft engine 100 significantly, leading to operational inconsistencies or operation at less than optimal conditions. Thus, when the aircraft engine 100 is stopped, it may be preferable to slowly rotate the rotor 104 during shutdown time to reduce, or eliminate, the temperature differential between the top Y and the bottom X of the rotor 104.

Figure 2:
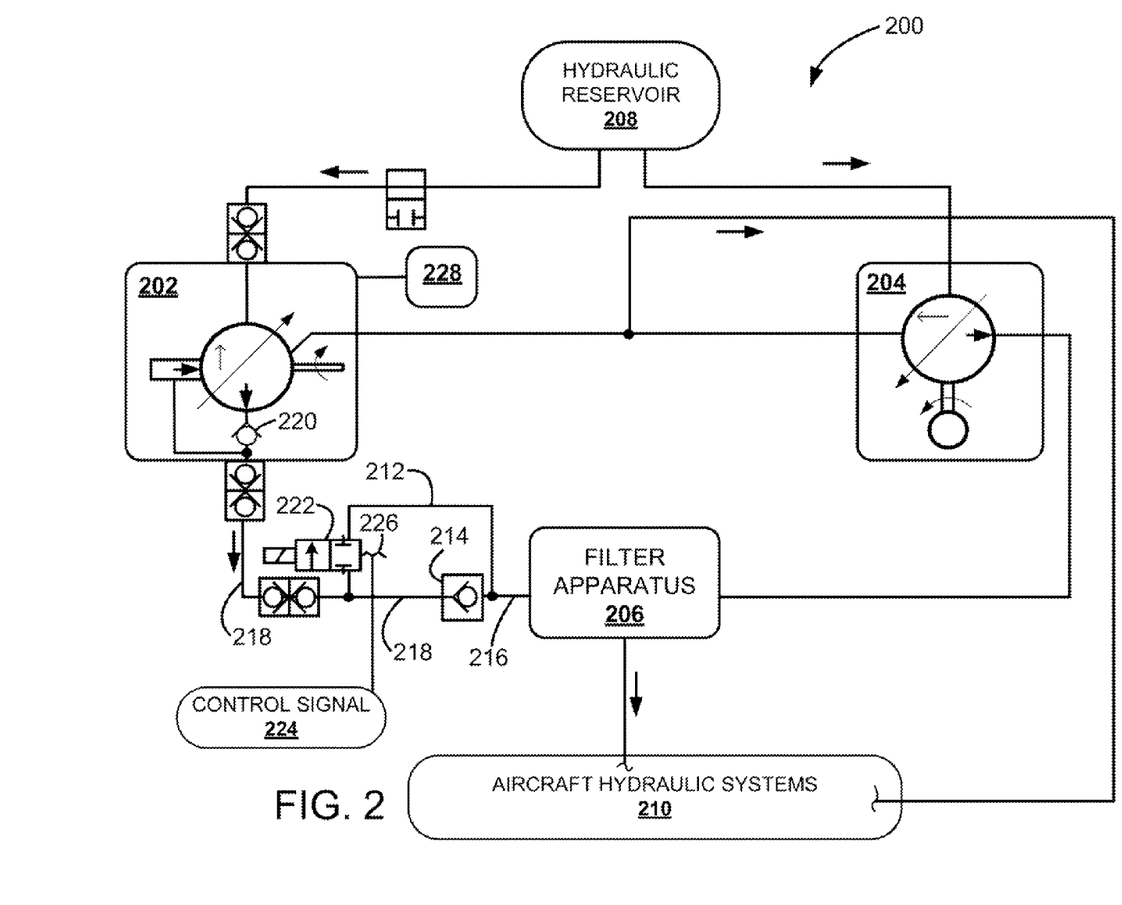
FIG. 2 is a piping diagram of a hydraulic plant operative to counter-rotate an engine driven pump according to at least one embodiment disclosed herein.

FIG. 2 is a piping diagram of a hydraulic plant 200 according to one embodiment. The hydraulic plant 200 is operative to counter-rotate an engine driven hydraulic pump 202 to rotate the aircraft engine 100. The counter-rotation of the aircraft engine 100 may reduce the temperature differential between the top Y and the bottom X of the rotor 104. In order to counter-rotate the aircraft engine 100, the hydraulic plant 200 is configured to supply hydraulic pressure through electrically powered hydraulic pump 204, through filter apparatus 206, and into engine driven hydraulic pump 202.

Figure 3:
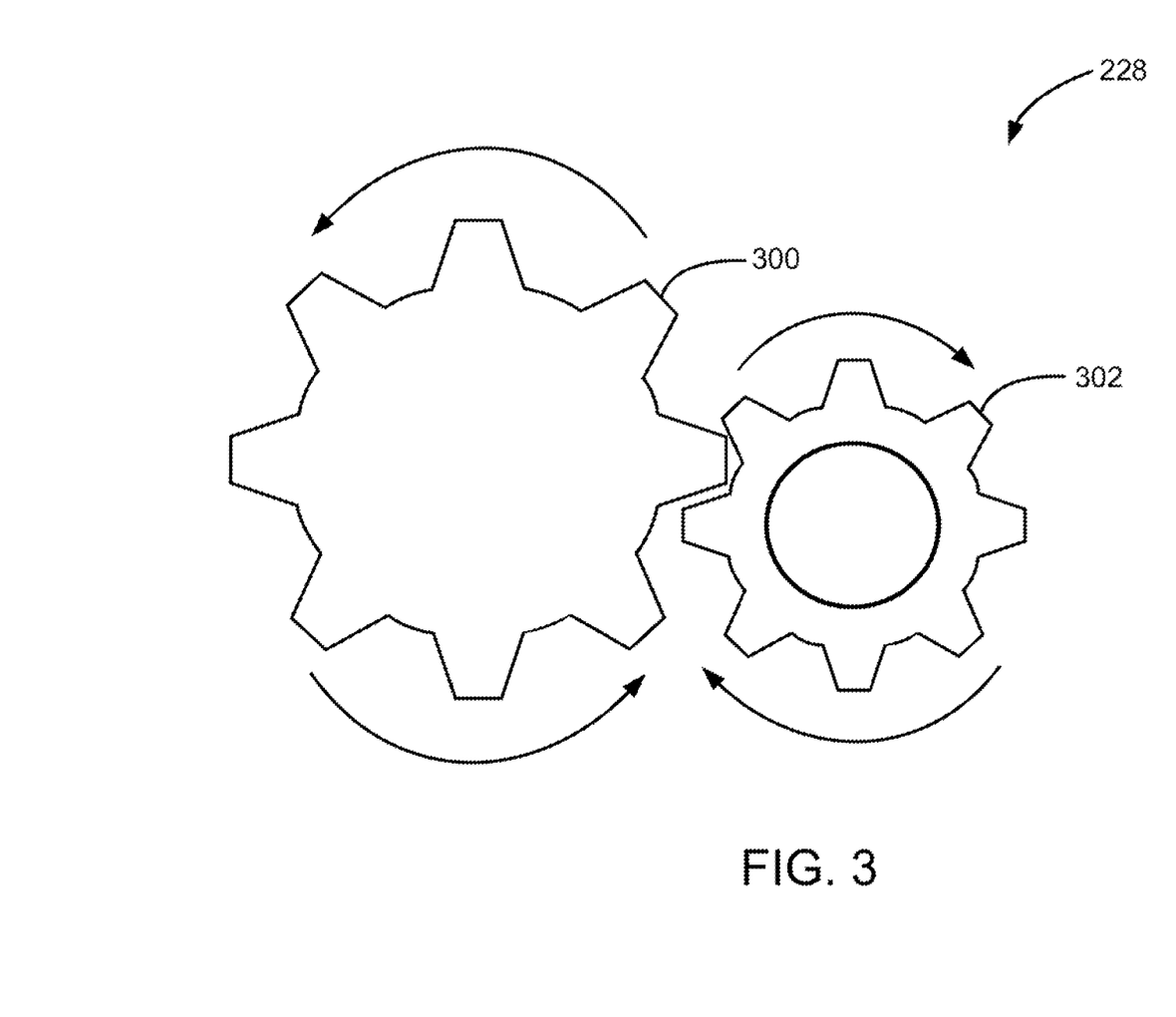
FIG. 3 is front view of the gears of an engine driven pump and an engine rotor according to at least one embodiment disclosed herein.

During a typical operation, the rotation of the rotor 104 of the aircraft engine 100 rotates the engine driven hydraulic pump 202 in a first direction via linkage 228, as illustrated in FIG. 3. The linkage 228 links, or places in mechanical communication, the rotor 104 to the engine driven hydraulic pump 202. In FIG. 3, the linkage 228 includes rotor gears 300 and pump gears 302. When the rotor 104 rotates, the rotor gears 300 rotate, which in turn rotate the pump gears 302. The rotation of the pump gears 302 rotates the pumping mechanism (not shown) of the engine driven hydraulic pump 202, increasing the pressure of the hydraulic plant 200 to pump hydraulic fluid in a first fluid direction from the engine driven hydraulic pump 202 to provide hydraulic power to the aircraft. It should be understood that the illustration and accompanying description of the linkage 228, including the rotor gears 300 and the pump gears 302, are for purposes of description only. The presently disclosed subject matter is not limited in any manner to a linkage with the same or similar configuration as the linkage 228, as other types of gear mechanisms, number of gears, etc. may be used depending on the particular application.

Returning to FIG. 2, while the rotor 104 of the aircraft engine 100 rotates, the engine driven hydraulic pump 202 rotates in a first direction to draw hydraulic fluid from a hydraulic reservoir 208 and supplies hydraulic fluid to aircraft hydraulic systems 210 in the first fluid direction. The aircraft hydraulic systems 210 may vary according to the particular configuration of the aircraft, but may include flight control systems, landing gear systems, and the like. The engine driven hydraulic pump 202 provides the hydraulic fluid through the filter apparatus 206 by way of hydraulic line 218 and out through the filter apparatus 206 to the aircraft hydraulic systems 210.

In some configurations, to prevent backflow through the filter apparatus 206, a filter check valve 214 is situated at an inlet/outlet 216 of the filter apparatus 206. The check valve 214 may, in some configurations, be used to provide for a proper fluid pressurization path from the engine driven hydraulic pump 202 to the aircraft hydraulic systems 210 in the first fluid direction. In some configurations, if the check valve 214 was not present, hydraulic pressure may enter the filter apparatus 206 in the incorrect direction, possibly causing a backflow of fluid within the hydraulic plant 200, which may cause damage to some of the aircraft hydraulic systems 210.

When the aircraft engine 100 is stopped, the rotor 104 of the aircraft engine 100 no longer provides the rotational motion to rotate the engine driven hydraulic pump 202. In most circumstances, the rotor 104 also begins to cool. To reduce the likelihood that the rotor 104 experiences an undesirable degree of warpage, the electrically powered hydraulic pump 204 may be used to rotate the engine driven hydraulic pump 202 in a second direction as a hydraulic motor by providing hydraulic fluid to the engine driven hydraulic pump 202 in a second fluid direction. The second direction of the engine driven hydraulic pump 202, when driven by the electrically powered hydraulic pump 204, is opposite to the direction of the engine driven hydraulic pump 202 when driven by the rotor 104. Because in some configurations the gears 300 of the rotor 104 remain engaged with the gears 302 of the engine, rotating the engine driven hydraulic pump 202 will cause the rotation of the rotor 104.

Thus, in some configurations, after or at a proximate time to shutting down the aircraft engine 100, the electrically powered hydraulic pump 204 may be engaged to pressurize a hydraulic line 218, which is the outlet of the engine driven hydraulic pump 202. Pressurizing the hydraulic line 218 may unseat the engine driven hydraulic pump check valve 220, forcing the rotation of the engine driven hydraulic pump 202, and in turn, forcing the rotation of the rotor 104.

But, in some configurations, the check valve 214 prevents the pressurization of the hydraulic line 218. Thus, the hydraulic plant 200 may include a solenoid-operated bypass valve 222 to bypass hydraulic fluid around the check valve 214, facilitating the pressurization of the hydraulic line 218. The solenoid-operated bypass valve 222 may receive a control signal 224 at valve solenoid control 226. A control signal may be an electrical signal that energizes the solenoid-operated bypass valve 222, thus opening the solenoid-operated bypass valve 222 as the solenoid-operated bypass valve 222 is an energize-to-open type of valve.

Thus, in one configuration, when energized, the solenoid-operated bypass valve 222 is operative to fluidically connect the electrically powered hydraulic pump 204 to the engine driven hydraulic pump 202, whereby the electrically powered hydraulic pump 204 provides hydraulic pressure to rotate the engine driven hydraulic pump 202, which in turn rotates the rotor 104.

In another configuration, when shut, the check valve 214 fluidically disconnects the electrically powered hydraulic pump 204 from the engine driven hydraulic pump 202. When fluidically connected, the solenoid-operated bypass valve 222 routes hydraulic fluid around the check valve 214. When the solenoid-operated bypass valve 222 is de-energized, the engine driven hydraulic pump 202 is fluidically disconnected from the electrically powered hydraulic pump 204, thereby stopping the rotation of the rotor 104.

The control signal 224 may be generated using various parameters associated with a rotor of an aircraft engine. For example, one parameter may be an amount of time. The control signal 224 may be based on an amount of time determined to a time suitable to reduce the warpage of the rotor 104. When the time expires, the control signal 224 may be used to close the solenoid-operated bypass valve 222, thus preventing the pressurization of the hydraulic line 218, ceasing the rotation of the rotor 104 because of the ceased rotation of the engine driven hydraulic pump 202.

The control signal 224 may also be generated in response to other parameters such as temperature, degree of warpage, and whether or not the aircraft engine is stopped. For example, the control signal 224 may be based on an input from a control system that monitors various conditions of the aircraft engine 100 or other systems of an aircraft. The rotor 104 may have warpage detectors that sense the amount of warpage the rotor 104 is experiencing. Above a certain warpage level, the control signal 224 may be activated, causing the rotation of the rotor 104. In another example, the rotor 104 may have temperature sensors. Above a certain temperature differential across the temperature sensors, the control signal 224 may be activated, causing the rotation of the rotor 104. When the temperature differential decreases below a certain amount, the control signal 224 may be removed. It should be understood that these parameters are examples of parameters and do not constitute an exhaustive list, as other parameters may be used and are considered to be within the scope of the present disclosure.

Figure 4:
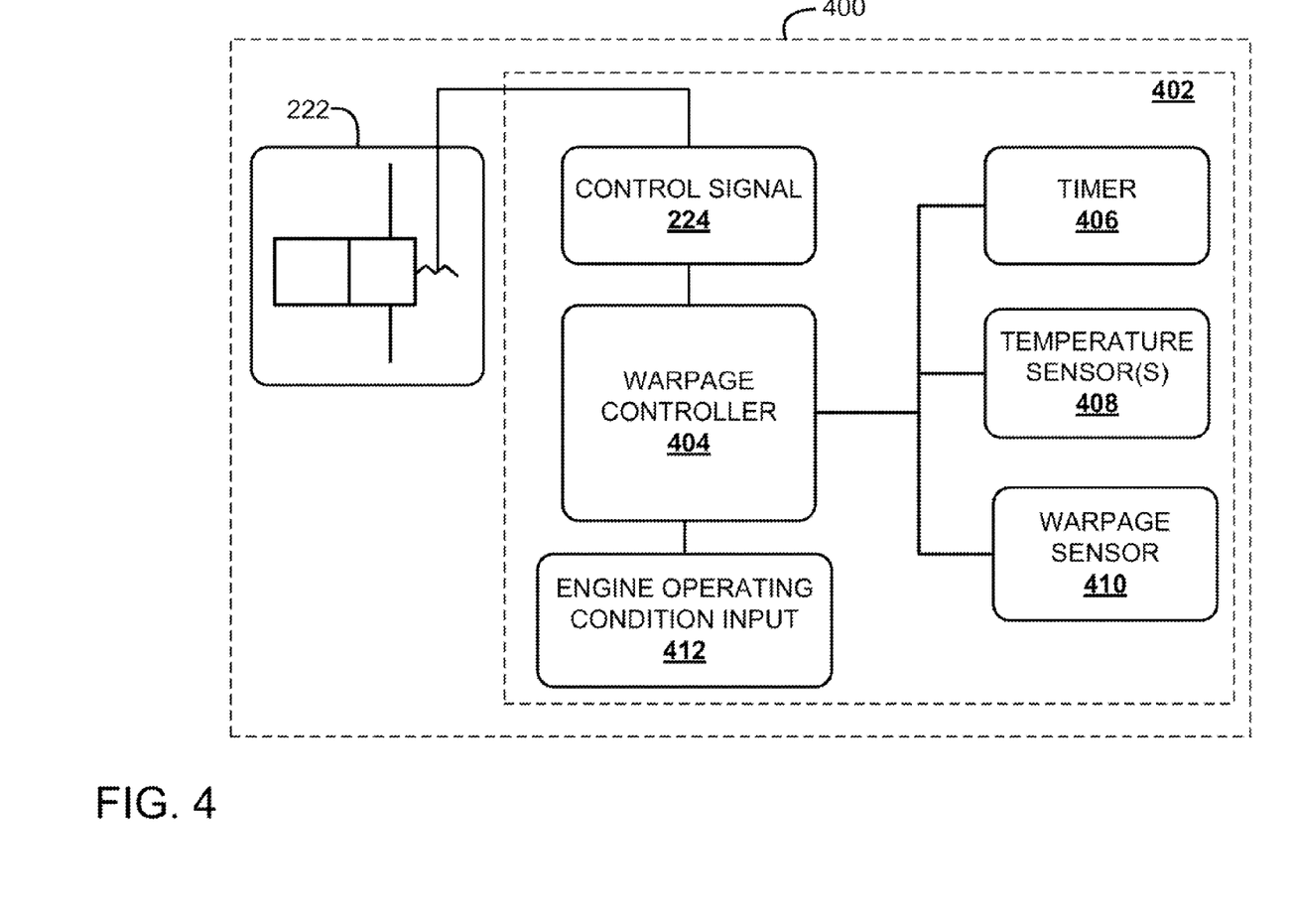
FIG. 4 is an illustration of a control system according to at least one embodiment disclosed herein.

FIG. 4 is an illustration of a control system 400 that may be used to provide the control signal 224 to rotate the engine driven hydraulic pump 202. The control system 400 may include a control circuit 402 and the solenoid-operated bypass valve 222. The control circuit 402 may include a warpage controller 404 operative to receive an input and, depending on the input, output the control signal 224 to open or close the solenoid-operated bypass valve 222. The inputs to the warpage controller 404 may come from various sources, including, but not limited to, a timer 406, temperature sensor(s) 408, and a warpage sensor 410.

The timer 406 may be used to provide a time input to the warpage controller 404. The time may be used by the warpage controller 404 to determine a period a time in which the rotor 104 should be rotated. The temperature sensor(s) 408 may be an input from one or more temperature sensors located on the rotor 104 or other areas, including other components of the aircraft engine 100. The warpage sensor 410 may be an input reflecting an amount of warpage (or bending) the rotor 104 is experiencing.

The control circuit 402 may also include an engine operating condition input 412. The engine operating condition input 412 may be a signal provided to the control circuit 402 that provides information that an aircraft engine is stopped. As used herein, "stopped mode" means that the aircraft engine is no longer producing power. In some configurations, the aircraft engine 100 is stopped when the aircraft engine 100 has completely stopped rotating. In other configurations, the aircraft engine 100 is considered stopped when the aircraft engine 100 is not producing power. These and other configurations are considered to be within the scope of the present disclosure. In some examples, the engine operating condition input 412 may be used as an interlock to reduce the probability that the electrically power hydraulic pump 204 attempts to rotate the rotor 104 while the rotor 104 is being rotated by the aircraft engine 100 while the aircraft engine 100 is producing power.

Figure 5:
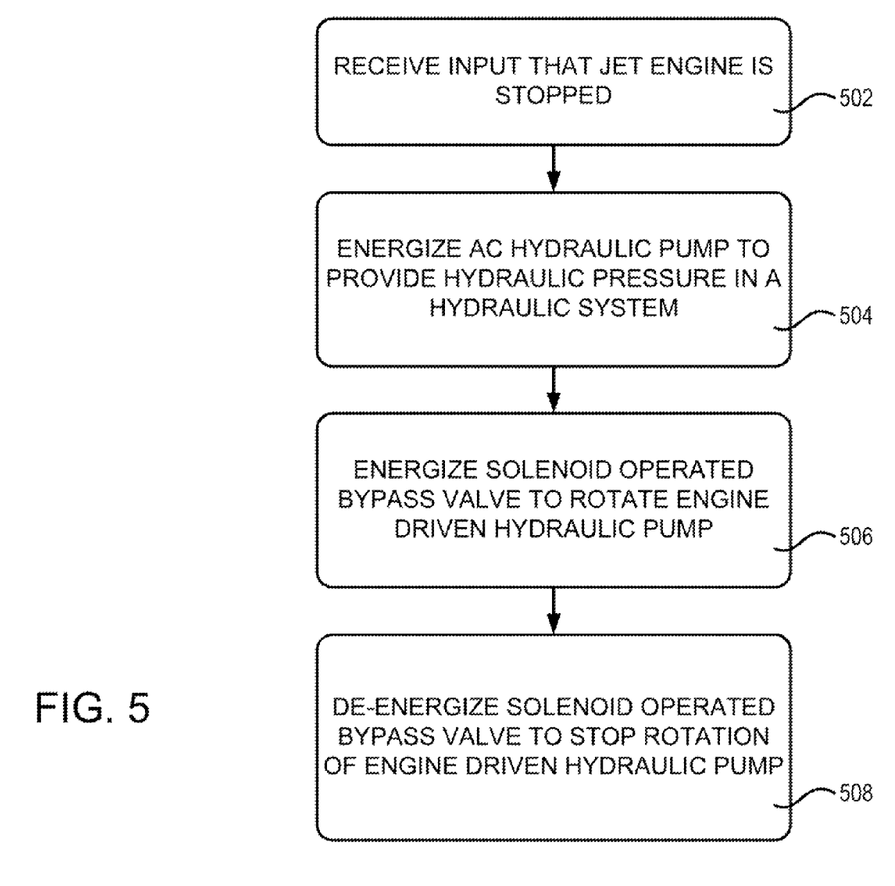
FIG. 5 illustrates one configuration of a routine for reducing the warpage of an aircraft engine rotor according to at least one embodiment disclosed herein.

FIG. 5 illustrates one configuration of a routine 500 for reducing the warpage of the rotor 104 according to at least one embodiment disclosed herein. Unless otherwise indicated, more or fewer operations may be performed than shown in the figures and described herein. Additionally, unless otherwise indicated, these operations may also be performed in a different order than those described herein.

The routine 500 commences at operation 502, where the engine operating condition input 412 is received, indicating that the aircraft engine is in stopped mode. As discussed briefly above, the engine operating condition input 412 may be used to reduce the likelihood that the engine driven hydraulic pump 202 receives hydraulic pressure from the electrically powered hydraulic pump 204, possibly causing the engine driven hydraulic pump 202 to impart a counter-rotational force against the rotor 104.

The routine 500 continues to operation 504, where the electrically powered hydraulic pump 204 is energized. When in fluidic communication with the engine driven hydraulic pump 202, the electrically powered hydraulic pump 204 provides hydraulic fluid flow (pressure) in a direction opposite to the direction normally provided by the engine driven hydraulic pump 202. During operation, the engine driven hydraulic pump 202 rotates in a first rotational direction caused by the mechanical linkage 228 with the rotor 104. The rotating action of the rotor 104 rotates the engine driven hydraulic pump 202. As discussed above in FIG. 1, the opposite direction of the fluid flow (or pressure) causes the engine driven hydraulic pump 202 to rotate in the opposite direction. Because of the mechanical linkage 228 with the rotor 104, the rotation of the engine driven hydraulic pump 202 imparts a rotational force on the rotor 104, causing the rotor 104 to rotate.

The routine 500 continues to operation 506, where a solenoid-operated valve is energized. In some configurations of a hydraulic system, such as the configuration illustrated in FIG. 2, the filter apparatus 206 can have the check valve 214 that is operative to prevent fluid flow in a direction opposite to the normal, operational direction when the aircraft engine is operating.

The check valve 214 can prevent fluid flow from the electrically powered hydraulic pump 204 thru the filter apparatus 206 in a different direction than normally supplied by the engine driven hydraulic pump 202. The solenoid-operated bypass valve 222 can be energized to allow fluid flow through the filter apparatus 206.

Depending on the pressure provided by the electrically powered hydraulic pump 204, the increase in pressure can cause the engine driven hydraulic pump 202 to rotate. In some configurations, the pressure may be maintained at the engine driven hydraulic pump 202 to provide a "constant-on" mode of operation, whereby the engine driven hydraulic pump 202 is constantly rotated. In another configuration, the pressure provided by the electrically powered hydraulic pump 204 may be pulsed by intermittently opening and closing the solenoid-operated bypass valve 222. In some configurations, the pulsing of the pressure may be termed a "pulsed mode of operation." The routine 500 continues to operation 508, where the solenoid-operated bypass valve 222 is de-energized and closed, ceasing the rotation of the engine driven hydraulic pump 202.

The subject matter described above is provided by way of illustration only and should not be construed as limiting. Various modifications and changes may be made to the subject matter described herein without following the example embodiments and applications illustrated and described, and without departing from the true spirit and scope of the present disclosure, which is set forth in the following claims.

What is claimed is:

1. A hydraulic plant operative to reduce rotor warpage, the hydraulic plant comprising:
    an engine driven hydraulic pump operative to receive a rotational force in a first direction from an engine rotor to supply hydraulic pressure to a hydraulic system in a first fluid direction;
    a filter apparatus operative to filter hydraulic fluid received from the engine driven hydraulic pump in the first fluid direction, the filter apparatus comprising a filter check valve to allow fluid flow in the first fluid direction and prevent fluid flow in a second direction;
    a hydraulic pump operative to provide hydraulic fluid to the engine driven hydraulic pump in the second fluid direction; and
    a bypass valve operative to bypass the filter check valve to allow hydraulic fluid flow in the second fluid direction to cause the engine driven hydraulic pump to rotate in a second direction to cause an aircraft engine to rotate.

2. The hydraulic plant of claim 1, wherein the bypass valve is a solenoid-operated bypass valve.

3. The hydraulic plant of claim 2, wherein the bypass valve is operative to open or close in response to a control signal.

4. The hydraulic plant of claim 1, wherein the bypass valve is opened and closed intermittently to provide for a pulsed mode of operation.

5. The hydraulic plant of claim 1, wherein the bypass valve remains open to provide a constant-on mode of operation.

6. The hydraulic plant of claim 1, wherein the hydraulic pump is electric current-powered.

7. A method for reducing aircraft engine rotor warpage in an aircraft engine, the method comprising:
    rotating an engine driven hydraulic pump in a first direction, wherein the engine driven hydraulic pump is linked to a rotor, to provide hydraulic fluid in a first fluid direction from the engine driven hydraulic pump to a hydraulic system;
    receiving an engine operating conditioning input that the aircraft engine is stopped;
    energizing an electric hydraulic pump to provide hydraulic flow in a second fluid direction;
    energizing a solenoid-operated bypass valve;
    in response to energizing the solenoid-operated bypass valve, routing the hydraulic fluid around a filter check valve, the filter check valve configured to prevent the hydraulic flow in the second fluid direction and allow hydraulic flow in the first fluid direction, wherein the first fluid direction of the hydraulic flow is a normal direction of fluid flow when the aircraft engine is rotating;
    causing the engine driven hydraulic pump to rotate in a second direction due to the hydraulic flow in the second fluid direction, wherein the second direction is opposite to the first direction in which the engine driven hydraulic pump rotates while the aircraft engine is operating;
    de-energizing the solenoid-operated bypass valve; and
    in response to de-energizing the solenoid-operated bypass valve, fluidically disconnecting the engine driven hydraulic pump from the electric hydraulic pump, stopping the rotation of the engine driven hydraulic pump.

8. The method of claim 7, further comprising receiving an input to de-energize the solenoid.

9. The method of claim 8, wherein the input comprises a time, a temperature or a degree of warpage.

* * * * *